United States Patent Office 3,184,867
Patented May 25, 1965

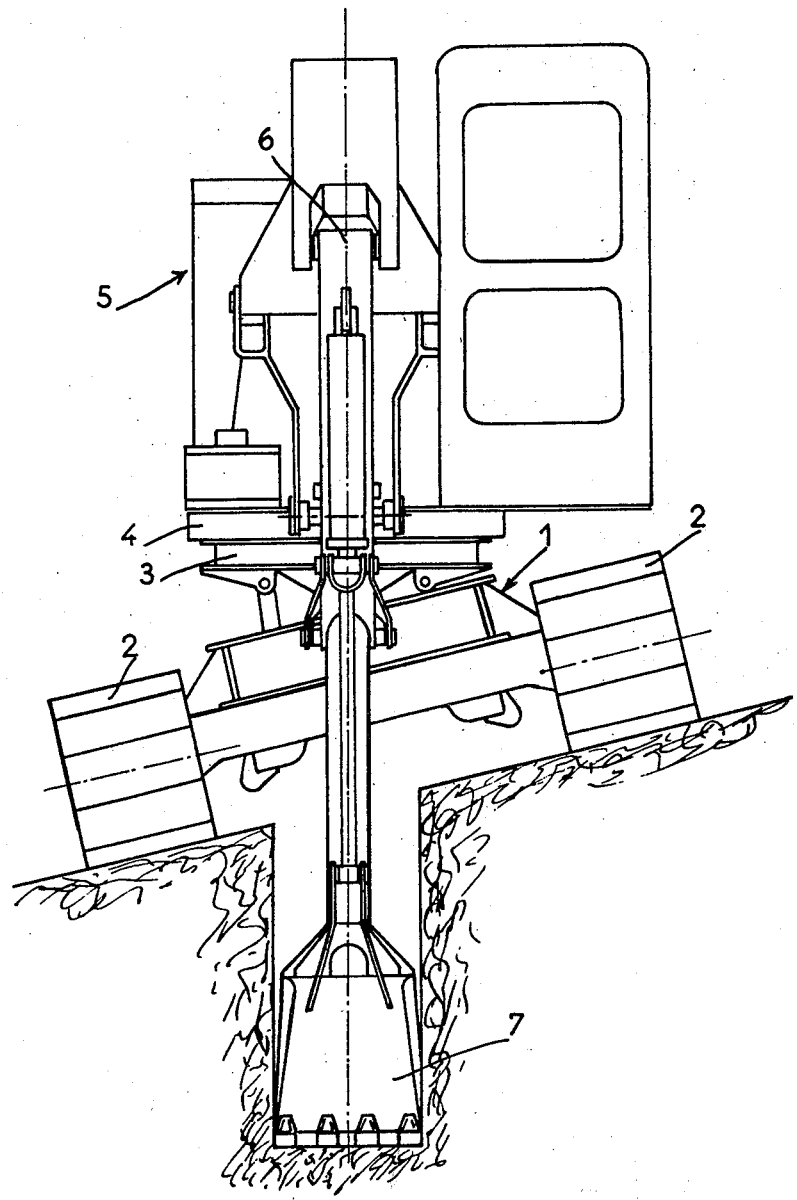

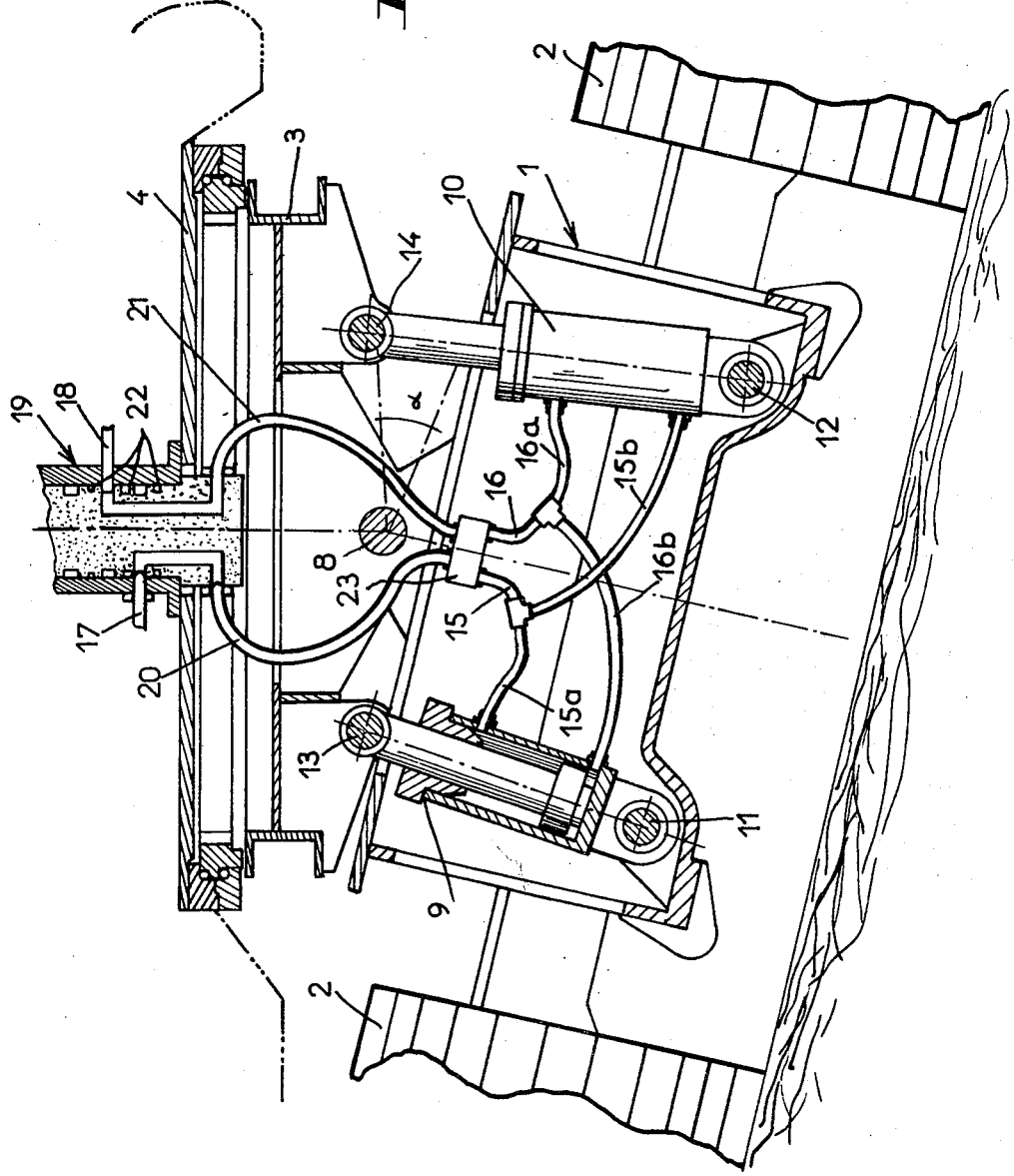

3,184,867
EARTHMOVING MACHINE HAVING PROTECTED TURNTABLE SEAL
William D. Symmank, Lyon, France, assignor to Societe dite: Yumbo, Genas, France, a corporation of France
Filed Feb. 25, 1963, Ser. No. 260,438
Claims priority, application France, Dec. 12, 1962, 918,408
2 Claims. (Cl. 37—103)

The present invention relates in general to self-powered earthmoving machines such as excavators, trenches, cranes, and also load-transporting vehicles, etc., whether of the wheel-type or the crawler-mounted or tracklayer type.

It is known that machines of this general type are used on off-the-road sites and rough soils, where the surface unevennesses and the gradients are more or less frequent and pronounced. The inclined position frequently taken by these vehicles on such rough soils, which varies during their motion, even in the case of machines equipped with special suspension systems, is prejudicial to the conditions of operation or transport of these vehicles. Thus, for example, cutting a trench by means of a power shovel, trencher or like excavator in a site having a pronounced gradient or marked surface unevennesses makes it necessary to set the dipper or like bucket in a proper direction with respect to the excavator, and also to modiy this setting continuously as the excavator moves along to complete the cutting, so that a considerable loss of time is experienced, without however obtaining perfectly vertical side walls.

In the case of a transport vehicle, the inclination of the carrier platform is detrimental to the load stability and may even constitute a very serious drawback when the load consists of a container or like receptacle filled with liquid.

It is the essential object of the present invention to avoid these drawbacks by creating a self-propelled machine adapted to move and to be operated on any grounds or soils, irrespective of their configuration.

The machine according to this invention is remarkable notably in that the platform designed for supporting the control cab, the equipment and/or the load container is mounted on a horizontal shaft extending at right angles to the wheel axes or to the axes of the crawler track driving sprockets, said platform being provided with actuating means adapted to cause said platform to pivot about said horizontal shaft in order to maintain a constant setting thereof irrespective of the inclination of the wheels or tracks to the horizontal, or on the contrary to set said platform in a predetermined inclined position to the horizontal.

It is clear that this specific mounting of the platform imparts a maximum stability thereto, so that the platform is insensitive to soil unevennesses. A first and obvious result of this arrangement is that trenches having perfectly vertical side walls can be cut even in very rough or inclined grounds. In the case of transport vehicles the present invention warrants a complete safety of the transported load since it eliminates any risk of slipping or drifting of the load during the vehicle motion.

According to a further feature characterizing this invention, said actuating means consist preferably of a hydraulic system comprising for example one or a plurality of hydraulic cylinders or the like.

The use of hydraulic means for the purpose specified is attended by a considerable flexibility of operation and a perfect continuity of the movements of the swivelling platform.

According to another feature of this invention, the aforesaid actuating means comprise preferably two identical hydraulic cylinders disposed symmetrically in relation to said horizontal shaft.

Still in accordance with the present invention, said hydraulic cylinders are of the double-acting type and fed in parallel from a common hydraulic circuit.

It is a complementary feature of this invention to connect the piston-rod side of one hydraulic cylinder to the piston side of the other cylinder, and vice versa.

In the specific case of a machine equipped with a hydraulic or drive motor power unit the circuit of said power unit and the circuit of said hydraulic cylinders pass through a common member consisting preferably of a rotary seal or the like.

With this arrangement, the operator can control by means of a distributor mounted in the cab or like control position both the hydraulic cylinders and the drive motor.

Finally, a member is provided for controlling said hydraulic cylinders automatically.

It is clear that by virtue of this control member the platform can be maintained in a constantly horizontal position during the movements of the machine without requiring any complementary control action from the operator or driver.

With the foregoing and other objects in view, the invention resides in the novel arrangement and combination of parts and in the details of construction hereinafter described and claimed, it being understood that changes in the precise embodiment of the invention herein disclosed may be made within the scope of the invention.

Other objects and advantages will become apparent from the following description taken in conjunction with the accompanying drawings in which:

FIGURE 1 is a diagrammatic, front elevational view showing an excavator equipped as a trencher and provided with the stabilizing device of this invention, and FIGURE 2 is a part-sectional view showing on a larger scale the platform of the excavator illustrated in FIGURE 1, with the means for actuating said platform.

In the form of embodiment shown in the attached drawings the excavator comprises essentially a frame structure 1 carried by a creeper undercarriage or crawler tracks 2 and a base plate 3 on which a swinging platform 4 is mounted. This platform 4 carries the equipment, control gear and cab assembly designated generally by the reference numeral 5. The equipment illustrated comprises a luffing boom 6 carrying on its outer end a dipper or like bucket 7.

The base plate 3 mounted on a substantially horizontal shaft 8 (FIGURE 2) rigid with the frame structure 1 is adapted to pivot through a more or less pronounced angle $\alpha$ which, in the case illustrated, is of the order of 13°. This shaft 8 is mounted in the direction of the longitudinal center line of the frame, that is, parallel to the crawler tracks or perpendicular to the wheel axes, in the case of a road vehicle. The angular position of base plate 3 about shaft 8 is controlled by means of a pair of hydraulic cylinders 9, 10 having their cylinder heads pivoted at 11, 12 on the frame structure and the outer ends of their piston rods pivoted at 13, 14 on the base plate through adequate brackets or like support means.

According to a specific feature of this invention, these hydraulic cylinders are of the double-acting type and fed in parallel from a common hydraulic circuit of which the compressed fluid feed lines 15, 16 are branched into sub-sections 15a, 15b and 16a, 16b, respectively, so that the piston-rod side of one cylinder is connected to the piston side of the other cylinder and vice versa.

The hydraulic cylinders 9, 10 are fed through a main distributor (not shown) of known and suitable design, housed in the control cab 5. Two feed lines 17, 18 connected to this distributor lead to a rotary seal 19 which may also be used for delivering compressed fluid to the track-driving hydraulic motors (not shown). Flexible tubings 20, 21 connect this rotary seal 19 to the cylinder feed lines. With this arrangement the operator or driver can control from a single distributor all the mechanisms and devices necessary to operate the excavator, this is, the aforesaid hydraulic cylinders and the crawler-track motors.

Since the excavator equipment and control cab are partly supported by the hydraulic cylinders 9, 10, the pressure applied to the hydraulic fluid is extremely high and therefore all the elements in contact with this fluid, especially the rotary seal packings 22, are subjected to this high pressure.

However, to prevent the normal operation of the swinging platform from involving a rapid destruction of the packings incorporated in the rotary seal 19, a valve 23 is inserted in the hydraulic circuit for isolating the rotary seal from the hydraulic cylinders 9, 10. Valve 23 is a valve of known type providing appropriate valve and seat arrangements to shut off the flow of fluid through lines 15, 16 at the control of the operator. This valve avoids any excess pressure in the seal when the cylinder control distributor is in the neutral position. As a result, the equipment and control cab carried by the platform 4 can be swung around without any risk of damaging the packings.

It is clear that although the present invention has been shown and described as applied to an excavator, it is also applicable to transport vehicles by providing a carrier base plate similar to the base plate 3 of the excavator shown in the drawings, and equipping this base plate with actuators and control means of same or equivalent character. It will be seen that in addition to the advantages set forth hereinabove, that is, the possibility of maintaining the vehicle platform strictly horizontal, the invention provides the additional advantageous feature of permitting any desired lateral inclination of this platform—within adequate limits—to facilitate the loading and unloading of the vehicle.

Many modifications and variations may be brought to the component elements of the vehicle or machine without departing from the scope of the invention. Thus, for example, a plurality of hydraulic cylinders could be mounted on either side of the horizontal shaft 8, and furthermore these hydraulic cylinders could be of a type differing from that illustrated; alternately, the cylinder disposal could differ for example in that the cylinder body is pivoted on the platform base plate 3 and the piston-rod is pivoted on the frame structure 1, etc. Similarly, the maximum angle of inclination of platform 4 could exceed 13°.

Of course, the invention should not be construed as being limited by the specific forms of embodiment illustrated, described and suggested herein, as many modifications may be brought thereto without departing from the scope of the invention as set forth in the appended claims.

What I claim is:

1. A self-propelled earthmoving machine comprising a frame structure carried by axles, a horizontal shaft on said frame structure extending at right angles to said axles, a platform pivotally mounted on said shaft, a turntable having a vertical pivot axis mounted on said platform, a rotary seal member on said pivot axis, said rotary seal being connected to ducts fed with a compressed fluid and having packings submitted to the pressure of said compressed fluid, at least two hydraulic cylinders, each one of said cylinders having a slidable piston rod system and being pivoted on said frame structure and on said platform, a hydraulic circuit for controlling the operation of said hydraulic cylinders, said hydraulic circuit comprising flexible tubings connected to said rotary seal, a valve fed by said flexible tubings, and feed lines connecting said valve to each one of said hydraulic cylinders whereby said rotary seal is isolated from said cylinders by said valve.

2. A self-propelled machine according to claim 1, wherein two identical cylinders of the double-acting type are provided, said cylinders being disposed symmetrically in relation to said shaft and being so connected to each other that the piston-rod supply end of one cylinder communicates with the piston supply end of the other cylinder and vice versa.

References Cited by the Examiner
UNITED STATES PATENTS

| | | | |
|---|---|---|---|
| 2,365,387 | 12/44 | Briscoe | 280—6 |
| 2,600,047 | 6/52 | Burnett. | |
| 2,684,254 | 7/54 | Goss | 280—6 |
| 2,771,958 | 11/56 | Ball. | |
| 2,847,134 | 8/58 | Slate. | |
| 2,872,200 | 2/59 | Kroll. | |
| 3,034,670 | 5/62 | Lafian | 214—138 |
| 3,051,323 | 8/62 | Kuhlenschmidt | 212—66 X |
| 3,068,596 | 12/62 | Hein | 37—129 |
| 3,126,653 | 3/64 | Bourgeous. | |

FOREIGN PATENTS 337,244  8/19  Germany.

BENJAMIN HERSH, *Primary Examiner.*
BENJAMIN BENDETT, *Examiner.*